United States Patent Office 2,933,323
Patented Apr. 19, 1960

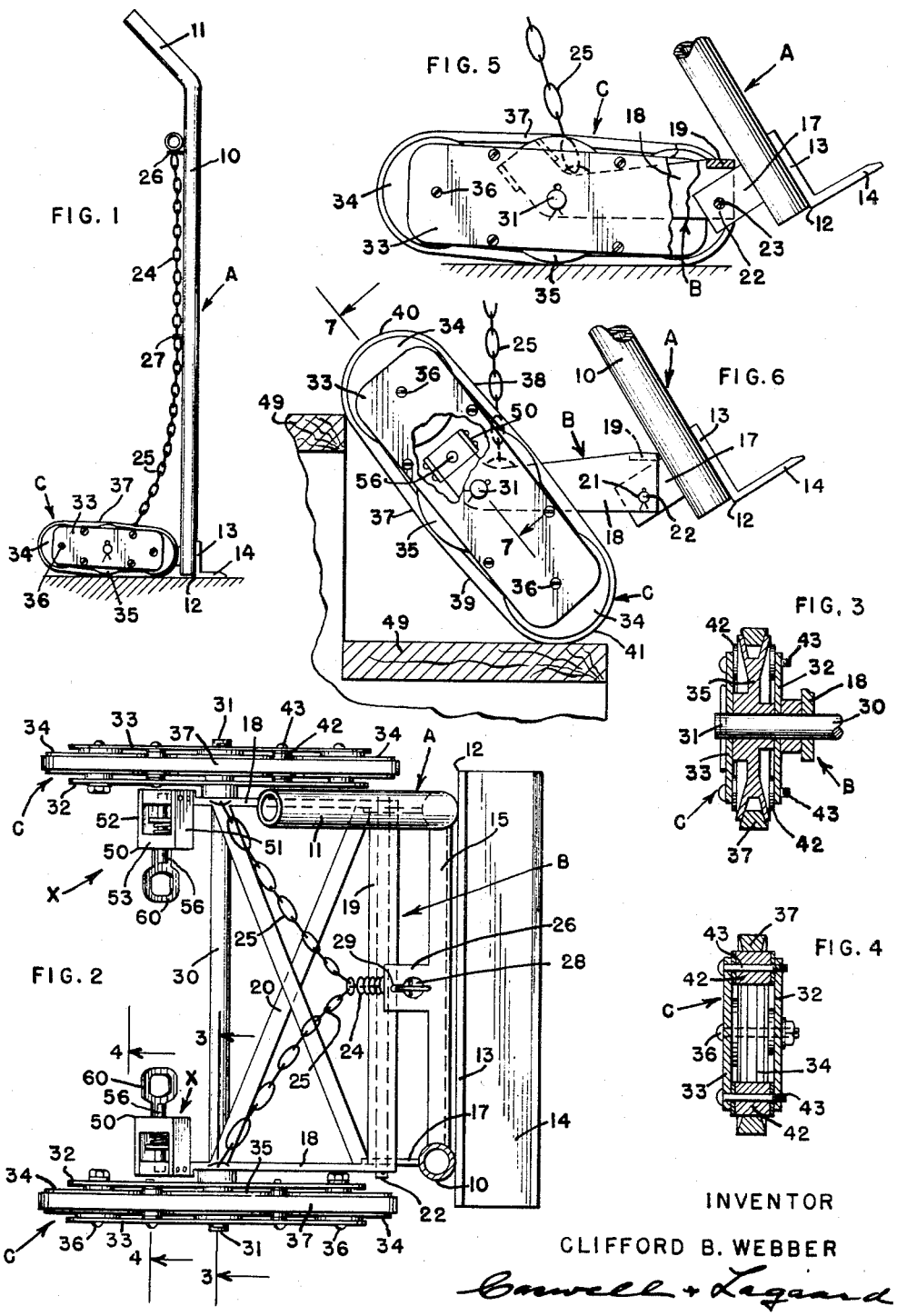

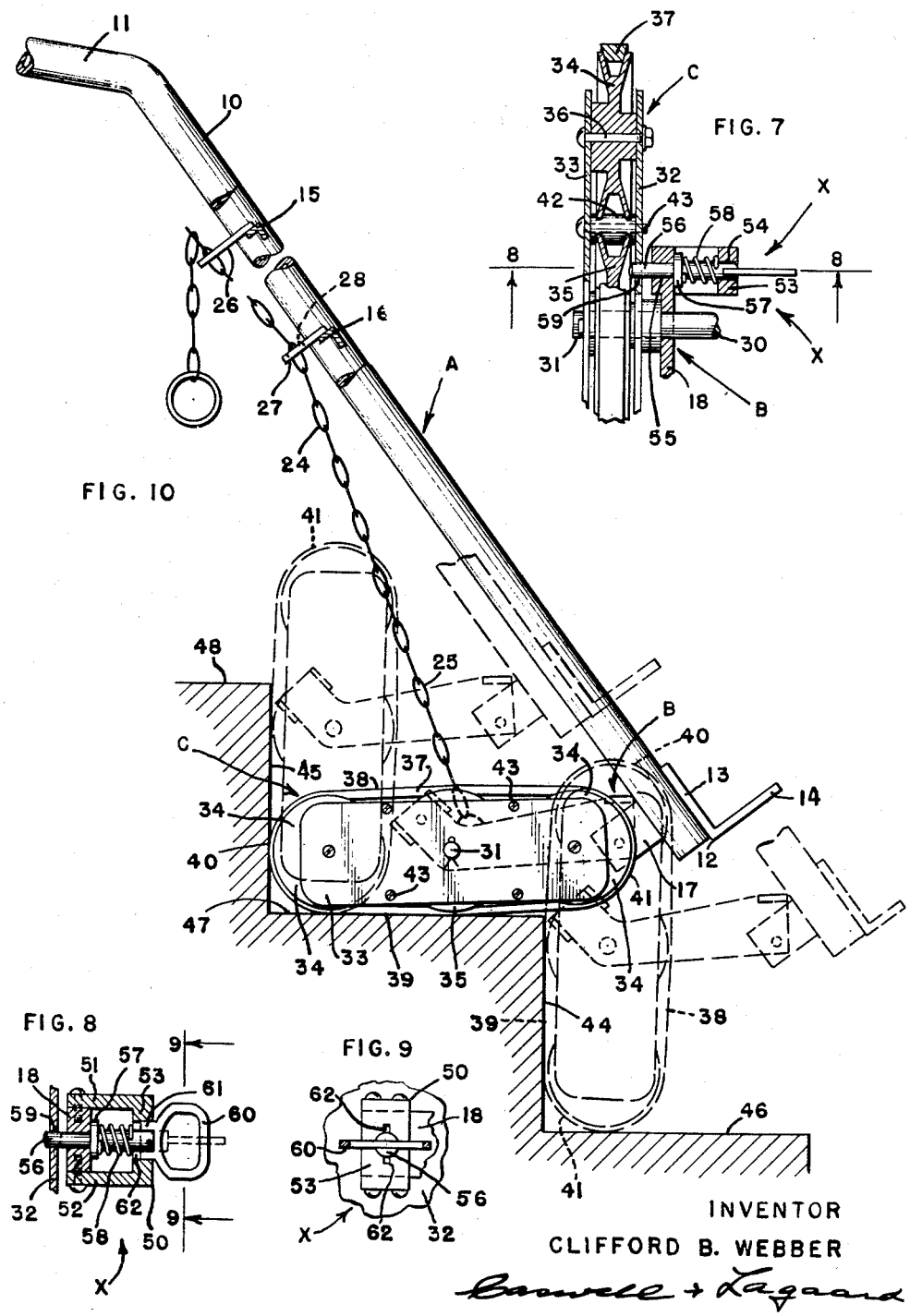

2,933,323

HAND TRUCK PROVIDED WITH ENDLESS TRACK STAIR CLIMBING MEANS MOUNTED FOR END OVER END MOVEMENT

Clifford B. Webber, Loveland, Colo.

Application July 18, 1957, Serial No. 672,730

1 Claim. (Cl. 280—5.22)

My invention relates to improvements in hand trucks and more particularly to hand trucks which are capable of conveniently transporting loads up and down stairs.

An object of the invention is to provide a hand truck, as aforesaid, of simple, durable and inexpensive construction, which is capable of being easily handled, under relatively heavy and bulky loads, in travel up and down flights of stairs as well as along footings of less severe contour.

More specifically, it is an object of my invention to provide a truck of the present nature having a load-receiving bed, a bolster pivotally supporting the bed, and a pair of runners supporting the bolster and provided with endless traveling treads, said runners being pivoted intermediately thereof to the bolster for independent tilting movement in travel over rough footings and for end-over-end tumbling movement in transit of the truck up and down stairs of the type having risers.

Another object of the invention is to provide means for conveniently depriving the bed of pivotal movement relative to the bolster, in a position of the bed with respect to the bolster wherein the bed is disposed to support a load in transit.

A further object of the invention is to provide means for angularly fixing the runners relative to the bolster, whereby, without tumbling, the runners' treads are disposed to ride the treads of stairs of the type devoid of risers.

Other objects of the invention reside in the novel combination and arrangement of parts and in the details of construction hereinafter illustrated and/or described.

In the drawing:

Fig. 1 is an elevational view of a hand truck constructed in accordance with my invention, the bed of the truck being shown in upright position for the reception of a load.

Fig. 2 is a plan view of the structure seen in Fig. 1, drawn in larger scale, with a portion of the bed broken away.

Fig. 3 is a vertical-sectional view in detail, taken as on the line 3—3 of Fig. 2, showing the construction of one of the runners of the truck.

Fig. 4 is a sectional view, similar to Fig. 3, taken as on the line 4—4 of Fig. 2.

Fig. 5 is a detail view showing the runners in elevation, with a portion of the near runner broken away, and showing portions of the bolster and bed in vertical section.

Fig. 6 is an elevational view of the truck structure with the upper portion of the bed broken away and with the runners of the truck resting on adjacent treads of a stair having no risers, a portion of the near runner being broken away to reveal the locking structure which deprives said near runner of pivotal movement relative to the bolster.

Fig. 7 is a detail sectional view taken as on the line 7—7 of Fig. 6, showing runner construction and the construction of the locking structure for depriving a runner of pivotal movement relative to the bolster of the truck.

Fig. 8 is a detail sectional view taken as on the line 8—8 of Fig. 7.

Fig. 9 is a detail sectional view taken as on the line 9—9 of Fig. 8.

Fig. 10 is an elevational view showing the truck in solid lines in one position with its runners bottomed in normal fashion on a tread of a stair having risers, said view including dotted-line illustrations of the truck in other dispositions thereof on the stair with the runners standing on end in positions assumed in the end-over-end tumbling thereof in transit of the truck up and down stairs.

The illustrated embodiment of my invention includes a bed A, bolster B and a pair of runners C.

The bed A has a pair of relatively spaced rails 10 which in the operation of the truck occupy positions more or less upright, the upper end portions of said rails 10 being turned back to form handles 11. A nose piece 12 in the form of an angle iron constitutes a crosstie between the bed rails 10 at their lower portions, a flange 13 of said nose piece being welded or otherwise secured to the front sides of the rails 10 flatly thereagainst with the other flange 14 projecting forwardly from the rails 10 at the lower extremities thereof for insertion beneath an object to be picked up from a floor and transported. Upper and intermediate crossties 15, 16 of angle iron extend from one rail 10 of the bed A to the other rail, each end of each of said crossties being butt-welded to its respective rail 10. Extending rearwardly from the lower portion of each bed rail 10 is a mounting lug 17.

The bolster B for the bed A is a generally horizontally disposed framework extending rearwardly from the lower portion of said bed. This framework has two relatively spaced side frame members 18, a crossbar 19 tying the side frame members 18 together at their forward extremities, and crossed diagonally disposed brace bars 20 extending from one end portion of one side frame member 18 to the opposite end portion of the other side frame member 18. Each side frame member 18 of the bolster B has a hole 21 (Fig. 6) therein downwardly spaced from the crossbar 19. A hinge rod 22, received in these holes 21 in the side frame members 18, is also received in holes 23 (Fig. 5) formed in the mounting lugs 17 on the bed A. Thus, through the medium of said hinge rod 22, the bed A is hinged to the bolster B for tilting movement forth and back thereon. This tilting movement of the bed A relative to the bolster B occurs between forward and rearward limits. At the forward limit of movement (Fig. 1) of the bed A, the rails 10 stand erect with the flange 14 of the nose piece 12 bearing flatly against a floor supporting the truck, the floor in such case acting as a stop preventing further forward tilting of the bed A. In said erect position of the bed A, it is disposed to pick up a load beneath which said flange 14 of the nose piece 12 may be directed by appropriate maneuvering of the truck. After the nose piece 12 has engaged beneath the load to be carried, the bed A with the load thereon is tilted back to its rearward limit of movement. This rearward limit of movement of the bed A relative to the bolster B is established by stop means constituted by the crossbar 19 of the bolster B and the rails 10 of the bed A, which rails at points above the hinge rod 22 engage said crossbar of the bolster B, as seen in Figs. 5, 6 and 10 of the drawing.

For releasably holding the bed A at the rearward limit of its tilting movement relative to the bolster B, a locking means is provided which includes a main upright length of chain 24 carried by the bed A and having at its lower end two branch chains 25 extending downwardly and oppositely outwardly to the corresponding sides of the bolster B, said branch chains 25 being connected at their lower ends to the bolster B by welding or otherwise fastening the same to the rear portions of the side frame members 18 of said bolster. The main chain 25 has upper and lower guides 26, 27 therefor extending rearwardly from the upper and lower crossties 15, 16 between the rails 10 of the bed A. Each of said guides 26 and 27 has an eye 28 therein in which said main chain 24 is freely threaded. The upper guide 26 is formed with a lock slot 29 (Fig. 2) extending rearwardly from the eye 28 in said guide. This slot 29 will receive any link of the main chain 24 applied thereto in edgewise fashion, but will not allow the relatively right angularly disposed link next above said slot to pass therethrough. Upon tightening the chain 24 and so holding it by catching the same in the lock slot 29 of the upper guide 26, the bed A may be held against tilting forwardly from its rearward limit of movement relative to the bolster B. Such fixation in the relationship of bed and bolster obtains in all operations of the truck other than in the loading and unloading thereof, as will later appear.

The bolster B is supplied with an axle shaft 30 for the runners C. This shaft 30 extends through the rear portions of the side frame members 18 of the bolster B and outwardly beyond each thereof providing a journal 31 at each side of the bolster B for one of the runners C.

The runners C being identical in construction, a detailed description of one runner will suffice for both. In the runner structure are elongated inner and outer frame plates 32, 33 between which are interposed peripherally grooved end wheels 34 of the same diameter, and a peripherally-grooved intermediate wheel 35 preferably of slightly greater diameter than that of said end wheels 34. The intermediate runner wheel 35 and the inner and outer frame plates 32, 33 are journaled on one of the journals 31 of the axle shaft 30 of the bolster B, each of the runner's end wheels 34 being journaled on a spindle 36 extending from one to the other of the inner and outer frame plates 32, 33 of the runner. A belt 37 providing an endless traveling tread for the runner C is fitted in the groove of said intermediate wheel 35 and in the grooves of said end wheels 34; said belt tread 37 thus having two main elongated opposed reaches 38, 39 and end reaches 40, 41 extending from one of said main reaches to the other. Between each end wheel 34 and the intermediate wheel 35, each of the main reaches 38, 39 of the tread belt 37 is supported at its inner side by means of an idler roller 42 journaled on a spindle 43 extending from one to the other of the inner and outer plates 32, 33 of the runner.

With the loaded bed A of the truck tilted back against the stop bar 19 of the bolster B and so held by the lock chain 24, the truck may be readily moved along ordinary footings, the belt treads 37 of the runners C in such cases spanning any small irregularities and individually rocking in accommodation of larger irregularities in a footing.

In travel of the loaded truck up and down a stair having risers, as at 44, 45 and treads 46, 47 and 48 (Fig. 10), the runners C turn end over end on their journals 31. It is to be noted that as to each runner C, its axis which is common to the two runners, is equidistant from the end reaches 40, 41 of the belt tread 37 and likewise equidistant from the main reaches 38, 39 thereof, which situation makes for the balancing of the runner C on its journal 31, the balancing of said runners being a preferred arrangement. More importantly it is to be noted that the distance between the axis of the journal 31 about which each runner turns and the point at each end of such runner most remote from said axis is less than the width of the tread of a stair up and down which the truck is to be moved. The reason for this will be apparent from the solid line illustration of the truck in Fig. 10, wherein the rear reach 40 of the belt tread 17, at its rearmost point, bears against the riser 45 of the stair and the axis of the runner's journal 31 is in a location inwardly removed from the edge of the stair tread 47. Each of the main reaches 38, 39 of the belt treads 37 of the runners C thus has a solid footing on the stair tread 47 with no likelihood of the runners toppling over the edge of said stair tread. In the lower dotted line position of the truck as seen in Fig. 10, the runners C stand on end on the stair tread 46. Moving the truck from this position to said solid line position (Fig. 10), the runners turn counterclockwise ninety degrees taking said solid line position with the main reaches 39 of the belt treads 37 resting on the next above stair tread 47 and with the end reaches 40 of the belt treads 37 bearing against the riser 45 of the stair. Continuing further upward, the runners C up end as shown in the upper dotted line position of the truck in Fig. 10, wherein the end reaches 40 of the belt treads 37 bear upon the stair tread 47. Further upward travel of the truck along the stair is followed by another ninety degree turn of the runners C as they move to position on the stair tread 48 with the main reaches 38 of the runners bearing thereon after the fashion of the main reaches 39 in their said bearing on said stair tread 47. When the truck descends a stair the action of the runners C is reversed as compared with the foregoing described action thereof. In either ascending or descending a stair having risers, the runners C become solidly bottomed on the stair treads giving the user of the truck complete control thereof without imposition of any burdensome effort upon him. It will be appreciated that upon movement of the runners C from stair tread to stair tread the action of the runners on the stair is such that the effort required of the user is substantially less than that required in bodily elevating the truck and its load or holding the same bodily against descent by gravity.

In traveling up and down a stair without risers and having treads 49 only, as shown in Fig. 6, the benefit of coaction between the end reaches 40, 41 of the runners C and stair risers of course cannot be attained. In such case, the runners C are releasably locked against turning relative to the bolster B and in such position that they substantially parallel the rails 10 of the bed A. Thus deprived of turning movement relative to the bolster B, the runners C ride a stairs with only the then lowermost of the reaches 38, 39 and the end reaches 40, 41 thereof contacting the foreportions of the stair treads. This imposes a greater burden on the user of the truck than is imposed upon him when the runners C are free to turn end over end on a stair having risers, but even then such greater burden is substantially less than would be imposed upon a user of an ordinary hand truck borne, as usual, by wheels only.

The illustrated means for locking the runners C against turning relative to the bolster B includes dual locking devices X, there being one such device for each runner C, a detailed description of one of which locking devices will suffice for both. The locking device X, in each case, includes a yoke 50 extending inwardly from a side frame member 18 of the bolster B. One arm 51 of the yoke 50 is secured at the end thereof to the upper edge of the upwardly slanted terminal portion of said side frame member 18, the other arm 52 being similarly secured at its end to the lower edge of said terminal portion of said side frame member 18. The shank portion 53 of the yoke 50, joining the said arms 51, 52 thereof, has a bore 54 therein axially aligned with the bore 55 in said side frame member 18. A lock bolt 56, slidably and revolubly received in said bores 54, 55, has an abutment 57 thereon between the side frame member 18 and said shank 53 of the yoke 50. A coiled expansion spring 58 encircling the bolt 56 and interposed between said yoke shank 53 and said abutment 57 on the bolt 56, acts yieldingly to thrust the bolt 56 outwardly to its full extent wherein said abutment 57 bears against said bolster frame member 18. In this outwardly thrust position of the bolt 56, its outer end portion is received in an aperture 59 formed in the inner frame plate 32 of the corresponding runner C (Figs. 7 and 8). Upon entering said aperture 59, the bolt 56 locks the runner C against turning on its journal 31, said aperture 59 being so located in the runner frame plate 32 that the runner C substantially parallels the bed rails 10 when said runner is locked against turning movement. At the inner end of the lock bolt 56 is a finger piece 60 by means of which the bolt 56 may be retracted against the action of the spring 58 and withdrawn from locking engagement with said frame plate 32 of the runner C. This finger piece 60 has thereon diametrically opposed keeper shoulders 61. These shoulders 61, except for two opposed angular positions of the finger piece 60 relative to the axis of the bolt 56, engage the inner face of the yoke shank 53 and hold the bolt 56 in retracted position of disuse, after the bolt has been withdrawn from engagement with the runner frame plate 32 and the finger piece 60 turned somewhat one way or the other. With the runner C angularly positioned to bring the aperture 59 in the runner's frame plate 32 into axial alignment with the bolt 56, and with said finger piece 60 on said bolt 56 in either of its said excepted angular positions, the spring 58 shifts the bolt 56 axially outward thrusting its outer end portion into locking position within said aperture 59, the keeper shoulders 61 on the finger piece 60 at the same time being freely received in slots 62 in the yoke shank 53 extending radially outward from the bore 54 in said shank.

It will now be readily comprehended that full accomplishment of the stated objectives of my invention are attained in the form thereof hereinbefore described.

Changes in the specific form of the invention, as herein described, may be made within the scope of what is claimed without departing from the spirit of the invention.

Having described the invention, what is claimed as new and desired to be protected by Letters Patent is:

A hand truck adapted to be moved up and down a stair having treads of a given width, said truck including a bed and a pair of runners, each runner having an elongated frame member, a pair of wheels journaled thereon, one wheel at each end of the frame member, and an endless traveling tread running freely over said wheels, said bed having handles at its upper portion and having at its lower portion a load-receiving nose piece and a mounting member for the runners including pivotal connections, one such connection for each runner, said connections having a common pivotal axis, each connection individually pivotally connecting the frame member of its respective runner to said mounting member for tilting and turning movements of the runner relative to the bed, the tread of each runner having opposed elongated main reaches extending from one wheel thereof to the other and having end reaches overrunning said wheels, the axis about which the runner turns being midway between the axes of said end wheels, the distance between such pivotal axis and that portion of each end reach most remote from said pivotal axis being less than said given stair-tread width, said runners being adapted to tumble end over end from one stair tread to the next with the opposed elongated main reaches of each runner alternately footing on successive treads, each main reach when footing on a stair tread bearing flatly thereagainst along that portion of the main reach extending from the rear end reach to a forward position at least as far in advance of said rear end reach as the pivotal axis of the runner.

References Cited in the file of this patent

UNITED STATES PATENTS

| | | |
|---|---|---|
| 224,741 | Stith | Feb. 17, 1880 |
| 1,812,875 | Henneuse | July 7, 1931 |
| 2,193,283 | Harberson | Mar. 12, 1940 |
| 2,498,445 | Pascoo | Feb. 21, 1950 |
| 2,742,973 | Johannesen | Apr. 24, 1956 |
| 2,747,883 | Frost | May 29, 1956 |

FOREIGN PATENTS

| | | |
|---|---|---|
| 38,846 | Norway | Jan. 28, 1924 |